(12) United States Patent
Khangar et al.

(10) Patent No.: US 12,181,274 B2
(45) Date of Patent: *Dec. 31, 2024

(54) TAPE MEASURE WITH TAPE BLADE INCLUDING END PROTECTIVE FILM

(71) Applicant: Milwaukee Electric Tool Corporation, Brookfield, WI (US)

(72) Inventors: Abhijeet A. Khangar, Pewaukee, WI (US); Collin D. Roesser, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/148,853

(22) Filed: Dec. 30, 2022

(65) Prior Publication Data

US 2023/0133967 A1 May 4, 2023

Related U.S. Application Data

(63) Continuation of application No. 17/100,371, filed on Nov. 20, 2020, now Pat. No. 11,543,226, which is a continuation of application No. PCT/US2020/030719, filed on Apr. 30, 2020.

(60) Provisional application No. 62/843,041, filed on May 3, 2019.

(51) Int. Cl.
*G01B 3/10* (2020.01)
*G01B 3/1003* (2020.01)
*G01B 3/1007* (2020.01)
*G01B 3/1056* (2020.01)
*G01B 3/1005* (2020.01)

(52) U.S. Cl.
CPC ......... *G01B 3/1003* (2020.01); *G01B 3/1007* (2020.01); *G01B 3/1056* (2013.01); *G01B 2003/1028* (2013.01); *G01B 2003/103* (2013.01)

(58) Field of Classification Search
CPC .... G01B 3/1003; G01B 3/1056; B01B 3/1007
USPC .................................................. 33/767, 771
See application file for complete search history.

(56) References Cited

U.S. PATENT DOCUMENTS

| | | |
|---|---|---|
| 2,089,209 A | 8/1937 | Walter et al. |
| 2,303,368 A | 12/1942 | Walter et al. |
| 2,354,756 A | 8/1944 | Henzel |
| 2,471,395 A | 5/1949 | Keuffel |
| RE23,133 E | 7/1949 | Kueffel et al. |
| 2,814,881 A | 12/1957 | Ljungberg |
| 3,121,957 A | 2/1964 | Brown |

(Continued)

FOREIGN PATENT DOCUMENTS

| | | |
|---|---|---|
| CN | 2705772 | 6/2005 |
| CN | 202066436 | 12/2011 |

(Continued)

OTHER PUBLICATIONS

U.S. Appl. No. 62/639,743, filed Mar. 7, 2018, Khangar et al.

(Continued)

*Primary Examiner* — George B Bennett
(74) *Attorney, Agent, or Firm* — Reinhart Boerner Van Deuren s.c.

(57) ABSTRACT

A tape measure including an elongate tape blade is shown. The tape measure includes a relatively short protective polymer film coupled to an end of the tape blade adjacent to the hook end of the tape blade.

20 Claims, 6 Drawing Sheets

(56) References Cited

U.S. PATENT DOCUMENTS

| | | | |
|---|---|---|---|
| 3,214,836 A | 11/1965 | West | |
| 3,330,709 A | 7/1967 | Zelnick | |
| 3,409,988 A | 11/1968 | Zelnick | |
| 3,439,428 A | 4/1969 | Zelnick | |
| 3,450,367 A | 6/1969 | Edgell | |
| 3,889,897 A | 6/1975 | Van Zelderen | |
| 3,942,738 A | 3/1976 | Rutty | |
| 4,198,458 A | 4/1980 | Mitsuishi et al. | |
| 4,286,387 A | 9/1981 | Di Diego | |
| 4,429,462 A | 2/1984 | Rutty | |
| 4,531,688 A | 7/1985 | Gall | |
| 4,835,870 A | 6/1989 | Rauch et al. | |
| 4,926,566 A | 5/1990 | McMurtry et al. | |
| 5,402,583 A | 4/1995 | Komura | |
| 5,471,761 A | 12/1995 | Cheng | |
| 5,738,743 A | 4/1998 | Lee | |
| 5,820,057 A | 10/1998 | Decarolis et al. | |
| 5,884,408 A | 3/1999 | Simmons | |
| 5,895,539 A | 4/1999 | Hsu | |
| 5,979,238 A | 11/1999 | Boege et al. | |
| 6,052,914 A * | 4/2000 | Soon | G01B 3/1056 33/758 |
| 6,115,933 A | 9/2000 | Li | |
| 6,148,534 A | 11/2000 | Li | |
| 6,237,243 B1 | 5/2001 | Cook | |
| 6,243,964 B1 | 6/2001 | Murray | |
| 6,249,986 B1 | 6/2001 | Murray | |
| 6,282,808 B1 | 9/2001 | Murray | |
| 6,324,769 B1 | 12/2001 | Murray | |
| 6,440,502 B1 | 8/2002 | Lee | |
| 6,449,866 B1 | 9/2002 | Murray | |
| 6,499,226 B1 | 12/2002 | Reda | |
| 6,637,124 B2 | 10/2003 | Pederson | |
| 6,643,947 B2 | 11/2003 | Murray | |
| 6,804,899 B2 | 10/2004 | Murray | |
| 6,907,676 B2 | 6/2005 | Liao | |
| 7,096,596 B2 * | 8/2006 | Hernandez, Jr. | G01B 3/1003 33/771 |
| 7,398,604 B2 | 7/2008 | Murray | |
| 7,565,751 B2 | 7/2009 | Murray | |
| 7,730,630 B1 | 6/2010 | Lamb | |
| 7,856,735 B2 | 12/2010 | Allezy et al. | |
| 8,117,762 B2 | 2/2012 | Delneo et al. | |
| 8,117,763 B2 | 2/2012 | Delneo et al. | |
| 8,356,418 B1 | 1/2013 | Hall | |
| 8,584,373 B2 | 11/2013 | Murray et al. | |
| 10,731,960 B2 | 8/2020 | Shen | |
| 10,989,512 B2 * | 4/2021 | McKenzie | G01B 3/1056 |
| 10,989,513 B2 | 4/2021 | McKenzie | |
| 11,118,887 B2 | 9/2021 | Orsini | |
| 11,543,226 B2 * | 1/2023 | Khangar | G01B 3/1007 |
| 2001/0003872 A1 | 6/2001 | Pederson | |
| 2001/0053436 A1 | 12/2001 | Li | |
| 2002/0073570 A1 | 6/2002 | Conder | |
| 2002/0129509 A1 | 9/2002 | Evans | |
| 2004/0071869 A1 | 4/2004 | Gilliam et al. | |
| 2005/0011082 A1 * | 1/2005 | Smith | A63B 57/357 33/758 |
| 2006/0034899 A1 | 2/2006 | Ylitalo et al. | |
| 2006/0053649 A1 | 3/2006 | Greally | |
| 2006/0059703 A1 | 3/2006 | Hernandez | |
| 2006/0130352 A1 | 6/2006 | Huang | |
| 2007/0074417 A1 | 4/2007 | Sun | |
| 2007/0079520 A1 | 4/2007 | Levine et al. | |
| 2009/0090016 A1 | 4/2009 | Roach | |
| 2011/0232119 A1 | 9/2011 | Smalls | |
| 2012/0036727 A1 | 2/2012 | McCarthy | |
| 2013/0067759 A1 | 3/2013 | Murray et al. | |
| 2017/0176159 A1 * | 6/2017 | Moreau | G01B 3/1003 |
| 2019/0056208 A1 | 2/2019 | Khangar et al. | |
| 2019/0383592 A1 | 12/2019 | Shen | |
| 2023/0028583 A1 * | 1/2023 | Liu | G01B 3/1003 |
| 2024/0077293 A1 * | 3/2024 | Jernigan | G01B 3/1003 |

FOREIGN PATENT DOCUMENTS

| | | |
|---|---|---|
| CN | 202432942 | 9/2012 |
| CN | 202757538 | 2/2013 |
| CN | 204612629 | 9/2015 |
| CN | 205482653 | 8/2016 |
| CN | 206756017 | 12/2017 |
| DE | 19628318 | 3/1998 |
| EP | 0100138 | 2/1984 |
| EP | 1411319 | 4/2004 |
| EP | 1444479 | 8/2004 |
| EP | 1647797 | 6/2012 |
| EP | 2400258 | 11/2014 |
| JP | 10-002701 | 1/1998 |
| WO | WO02057710 | 7/2002 |
| WO | WO03031903 | 4/2003 |
| WO | WO2004063659 | 7/2004 |
| WO | WO17172683 | 10/2017 |

OTHER PUBLICATIONS

International Search Report and Written Opinion for International Application No. PCT/US2020/030719, dated Aug. 21, 2020, 15 pages.

Dewalt, 16 FT Tape Measure—DWHT36405 Brochure, <https://www.dewalt.com/en-us/products/hand-tools/measuring-and-layout-tools/16-ft-tape-measure/dwht36105>, a commercially available tape measure including a tape measure blade believed to be representative of a tape measure blade commercially available before Sep. 8, 2016, 5 pages.

Stanley, 16 ft FATMAX Tape Measure—33-7416 Brochure, <https://www.stanleytools.com/en-us/products/hand-tools/measuring-layout/fatmax-tape-measure/16-ft-fatmax-tape-measure/33- 716>, a commercially available tape measure including a tape measure blade believed to be representative of a tape measure blade commercially available before Sep. 8, 2016, 6 pages.

Dewalt, 16' × 1-1/4" Premium Tape—DWHT33924 Brochure, <https://www.dewalt.com/en-us/product-repository/products-dewalt/2016/04/13/16/16/dwht33924>, a commercially available tape measure including a tape measure blade believed to be representative of a tape measure blade commercially available before Sep. 8, 2016, 5 pages.

Milwaukee, 16ft Magnetic Tape Measure—48-22-7116 Brochure, <https://www.milwaukeetool.com/Products/Hand-Tools/Measuring/Short-Tape-Measures/48-22-7116>, a commercially available tape measure representative of a tape measure blade commercially available before Sep. 8, 2016, 3 pages.

* cited by examiner

| FILM TYPE | TENSILE STRENGTH (MPA) | % ELONGATION @ BREAK |
|---|---|---|
| PET667 | 170 | 130 |
| TPU1 | 14.7 | 150 |
| TPU2 | 59.9 | 540 |

TAPE MEASURE WITH TAPE BLADE INCLUDING END PROTECTIVE FILM

CROSS-REFERENCE TO RELATED PATENT APPLICATIONS

The present application is a continuation of U.S. application Ser. No. 17/100,371, filed Nov. 20, 2020, which is a continuation of International Patent Application No. PCT/US2020/030719, filed Apr. 30, 2020, which claims the benefit of and priority to U.S. Provisional Application No. 62/843,041, filed on May 3, 2019, which are incorporated herein by reference in their entireties.

BACKGROUND OF THE INVENTION

The present invention relates generally to the field of tools. The present invention relates specifically to a tape measure, measuring tape, retractable rule, etc., that includes a relatively short reinforcing polymer film coupled to the end of the tape blade adjacent the outer hook end of the tape blade.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned, storing energy as the tape is extended and that releases energy to spin the reel, winding the blade back onto the reel.

SUMMARY OF THE INVENTION

One embodiment of the invention relates to a tape measure including a reinforced tape blade. The tape blade includes a metal core, a first coating layer on an upper surface of the metal core, a second coating layer on the lower surface of the metal core. A hook assembly is coupled to a first end of the tape blade. The tape measure includes a protective polymer film adhered to an outer surface of least one of the first coating layer and the second coating layer adjacent the hook assembly such that a portion of the hook assembly extends over the protective film in the lengthwise direction of the tape blade. A longitudinal length of the protective film is less than 10 inches and specifically is 4 to 8 inches. In various embodiments an adhesive layer binds the protective film to the adjacent coating layer. In various embodiments, a peel strength of the protective film to the adjacent coating layer is greater than 9 lbs.

Another embodiment of the invention relates to a tape measure including a housing, a reel rotatably mounted within the housing and an elongate blade wound around the reel. The elongate blade has an inner end coupled to the reel and an outer end extending out of the housing. The tape measure includes a hook assembly coupled to the outer end of the elongate blade and a retraction system coupled to the reel. The retraction system drives rewinding of the elongate blade on to the reel. The elongate blade includes an elongate metal core having an upper surface and a lower surface, and the upper surface includes a concave curved section and the lower surface includes a convex curved section. The elongate blade includes an upper polymer coating layer covering at least a portion of the upper surface of the elongate metal core and a lower polymer coating layer covering at least a portion of the lower surface of the elongate metal core. The elongate blade includes an ink layer forming a series of measurement markings and is located between the upper surface of the elongate metal core and the upper polymer coating layer. The elongate blade includes a protective film coupled via an adhesive to an outer surface of the lower polymer coating layer adjacent to the outer end of the elongate blade, and the protective film has a length that is less than 20% of a total length of the elongate blade.

Another embodiment of the invention relates to a tape measure including a housing and a reel rotatably mounted within the housing. The tape measure includes an elongate blade wound around the reel, and the elongate blade has an inner end coupled to the reel and an outer end. The tape measure includes a hook assembly coupled to the outer end of the elongate blade and a retraction system coupled to the reel. The retraction system drives rewinding of the elongate blade on to the reel. The elongate blade includes an elongate metal core having an upper surface and a lower surface. The upper surface includes a concave curved section and the lower surface includes a convex curved section. The elongate blade includes a protective film coupled via an adhesive to the elongate metal core. The protective film has a length less than a total length of the elongate blade, and a peel strength between the protective film and an adjacent surface of the elongate blade is greater than 9 lbs.

Another embodiment of the invention relates to a tape measure including a housing and a reel rotatably mounted within the housing. The tape measure includes an elongate blade wound around the reel, and the elongate blade has an inner end coupled to the reel and an outer end. The tape measure includes a hook assembly coupled to the outer end of the elongate blade and a retraction system coupled to the reel. The retraction system drives rewinding of the elongate blade on to the reel. The elongate blade includes an elongate metal core having an upper surface and a lower surface. The upper surface includes a concave curved section and the lower surface includes a convex curved section. The elongate tape blade includes an upper nylon coating layer covering at least a portion of the upper surface of the elongate metal core and a lower nylon coating layer covering at least a portion of the lower surface of the elongate metal core. The elongate blade includes an ink layer forming a series of measurement markings and is located between the upper surface of the elongate metal core and the upper nylon layer. The elongate blade includes a pressure-sensitive adhesive layer coupled to at least one of an outer surface of the upper nylon coating layer and an outer surface of the lower nylon coating layer. The elongate blade includes a protective film coupled to the pressure-sensitive adhesive layer adjacent to the outer end of the elongate blade.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

DETAILED DESCRIPTION

Referring generally to the figures, various embodiments of a tape measure are shown. Various embodiments of the tape measure discussed herein include an outer polymer film layer coupled to a relatively short length of the tape measure blade located adjacent to the hook end of the tape measure blade. Applicant has found that by reinforcing a relatively short length of tape blade adjacent the hook, the tape blade will be more resistant to wear, damage, cracking, etc. than tape blades without such reinforcement, while at the same time decreasing total tape coil diameter by limiting the reinforcing film to only a short section of the tape blade. Further, in some embodiments, Applicant has found that a protective film having relatively high stiffness, further protects the tape blade from whipping during tape blade retraction.

In addition, in various embodiments, Applicant has developed a tape measure blade with an adhered, short, hook-end protective film, with a very high peel strength or adherence to the adjacent layer of the tape blade. Through Applicant's testing, Applicant determined that a film applied to a short length of the tape blade may be subject to delamination during extend/retract cycles. Therefore, as discussed in various embodiments herein, Applicant's designs include very high levels of peel strength not believed present in commercially available tape measures.

In addition, Applicant has determined that the short, hook-end protective film discussed herein help to allow for fast retraction time (0.6-1 sec from 8') as stiffness of the tape blade is increased by a film that helps resist whipping of tape blade upwards at faster speeds. In addition, Applicant has determined that the short, hook-end protective film discussed herein increases the fatigue life of the blade even when whipping does occur. In addition, Applicant has determined that the short, hook-end protective film discussed herein holds the blade together longer even if tape cracks film, which prevents it from hanging up on housing's components during retraction.

As noted below, in a specific embodiment, the short, hook-end protective film discussed herein is located on the bottom surface of the tape blade. In such embodiments, Applicant has determined that this placement has better performance in cold weather during tape whip.

Figure 1:
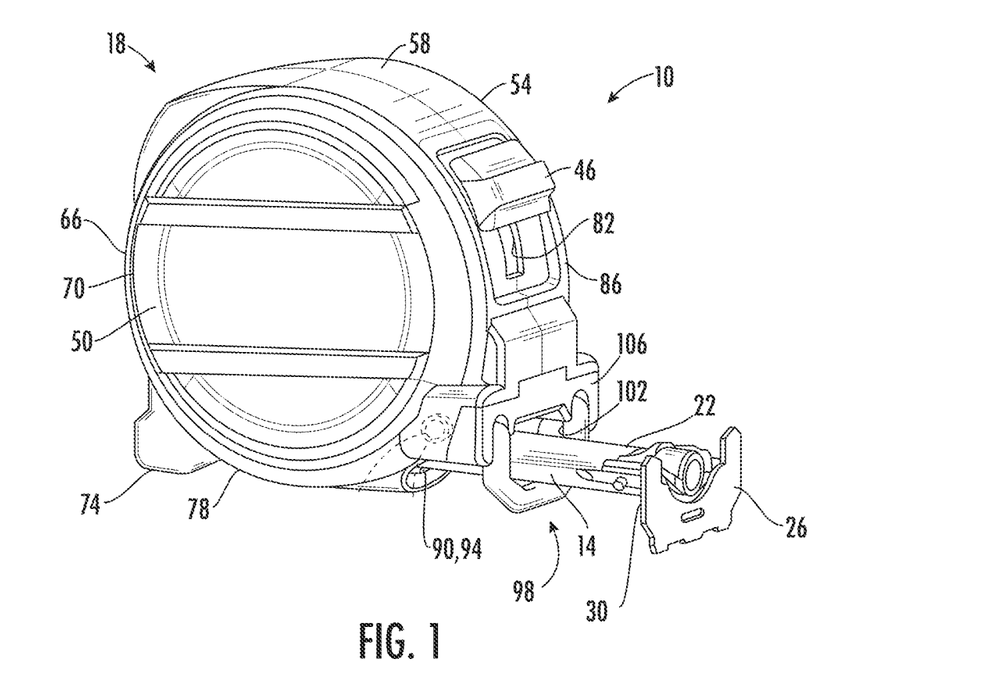
FIG. 1 is a left side perspective view of a tape measure, according to an exemplary embodiment.
Figure 2:
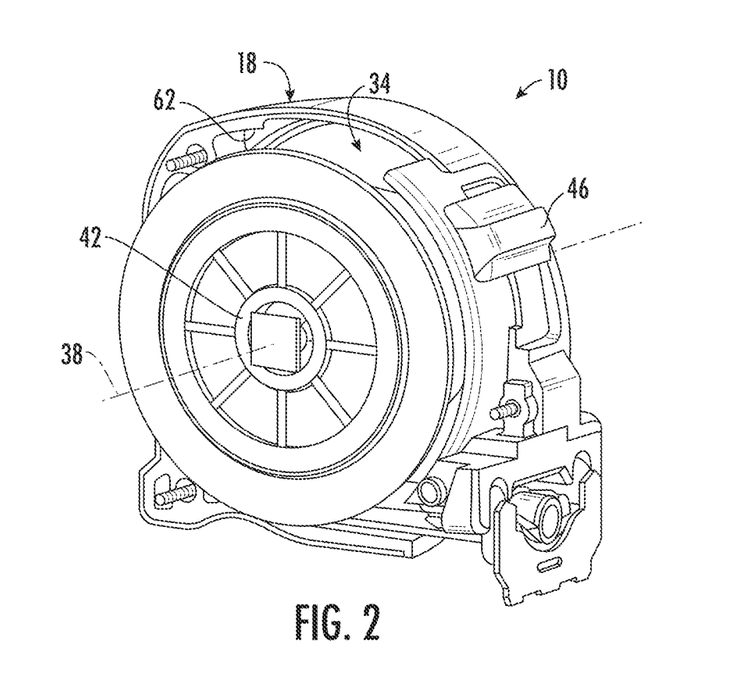
FIG. 2 is a left side perspective view of the tape measure of FIG. 1 with a portion of the tape measure housing removed, according to an exemplary embodiment.

Referring to FIG. 1 and FIG. 2, a tape measure, such as tape measure 10, is shown according to an exemplary embodiment. Tape measure 10 includes a tape blade, shown as coilable tape blade 14, and a housing 18. In general, tape blade 14 is an elongate strip of material including a plurality of graduated measurement markings, and in specific embodiments, tape blade 14 is an elongate strip of metal material (e.g., steel material) that includes an outermost end coupled to a hook assembly, shown as hook assembly 26. In one embodiment, hook assembly 26 includes one or more magnets to facilitate coupling of hook assembly 26 to a workpiece during measurement. As will be discussed in more detail below, tape blade 14 may include various coatings and layers (e.g., polymer coating layers, films, etc.) to help protect tape blade 14 and/or the graduated markings of the blade from wear, breakage, whipping, etc., particularly during tape blade retraction. In one embodiment, the first layer around steel is the paint, on which the measuring scale is printed, and then the polymer or lacquer coating, on which the PET film is pasted.

As shown in FIG. 1, a variable-length extended segment 22 of the tape blade 14 is retractable and extendable from the housing 18. Hook assembly 26 is fixedly coupled to an outer end portion 30 of tape blade 14. In various embodiments, tape blade 18 has a maximum length that may be extended from the housing of between 10 ft. and 50 ft.

As shown in FIG. 2, an inner end of tape blade 14 is coupled to a reel 34, and the non-extended portion of tape blade 14 is wound onto reel 34, which is surrounded by housing 18. Reel 34 is rotatably disposed about an axis 38 of tape measure 10, and a retraction system or mechanism 42 is coupled to reel 34 and configured to drive reel 34 about rotation axis 38 which in turn provides powered retraction of tape blade 14. In general, retraction mechanism 42 drives rewinding of the elongate blade on to tape reel 34. Retraction mechanism 42 may include one or more elongated spiral springs that provide the retraction energy to retraction mechanism 42. In other embodiments, retraction mechanism 42 includes other mechanisms such as one or more electric motors. A tape lock 46 is provided to selectively engage tape blade 14, which acts to restrain retraction mechanism 42 such that extended segment 22 of tape blade 14 remains at a desired length.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 have a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74, which extends from a lower portion 78 of the peripheral wall 58.

A slot 82 is defined along a forward portion 86 of peripheral wall 58. Slot 82 provides an opening in the tape measure housing, which allows tape lock 46 to extend into housing 18. In addition, slot 82 provides a length sufficient to allow tape lock 46 to be moved relative to housing 18 between locked and unlocked positions.

Below the slot 82, a tape blade opening in the housing, shown as tape port 90, is provided in peripheral wall 58. Tape port 90 has an arcuate shape 94, corresponding to an arcuate cross-sectional profile of tape blade 14. The tape port 90 allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape blade 14 is in the retracted position, a rear surface of the hook assembly 26 abuts guard 102.

Figure 3:
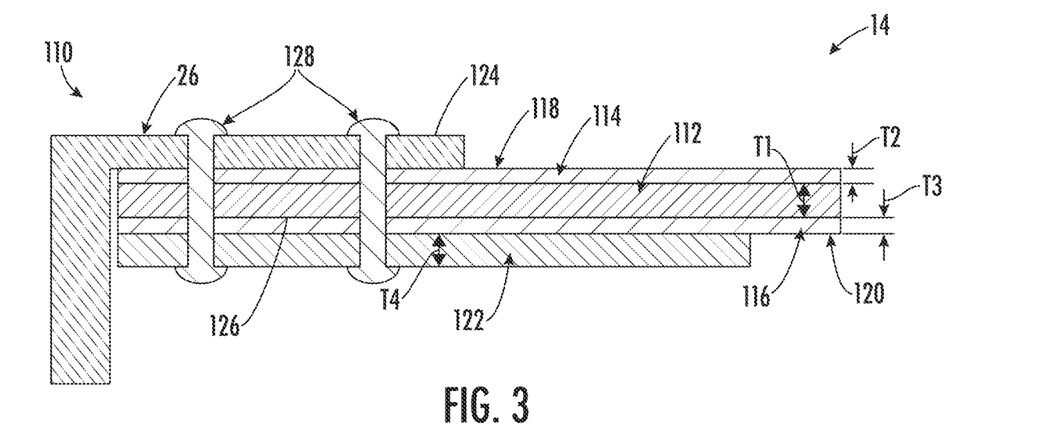
FIG. 3 is a cross-sectional view of the hook end of a tape blade of the tape measure of FIG. 1 showing a tape blade film located on the bottom of the tape blade, according to an exemplary embodiment.
Figure 4:
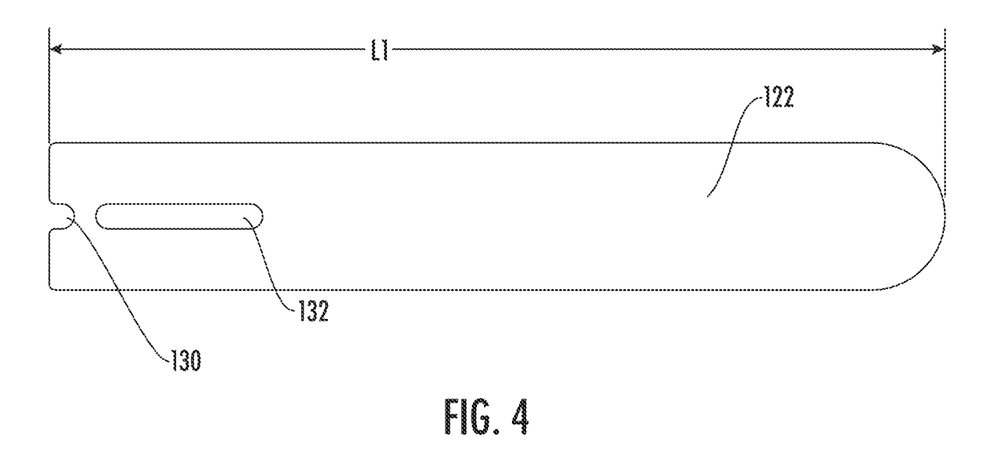
FIG. 4 is a top view of the tape blade film of FIG. 3, according to an exemplary embodiment.

Referring to FIGS. 3 and 4, a hook end 110 of tape blade 14 is shown according to an exemplary embodiment. Tape blade 14 includes an elongate metal core or inner layer 112 formed from a thin, elongate strip of metal material. In a specific embodiment, inner layer 112 is formed from a strip of steel material. In a specific embodiment, inner layer 112 has a thickness, T1, between 0.09 mm and 0.2 mm, specifically, between 0.1 mm and 0.18 mm (with up to a 25% thickness variation), and more specifically of 0.11 mm to 0.13 mm. As will be understood inner layer 112 may be formed in a concavo-convex configuration, which provides for the curved shape of tape blade 14 shown in FIG. 1. In such an arrangement, the upper surface of tape blade 14 and inner layer 112 includes a concave curved section, and the lower surface of tape blade 14 and inner layer 112 includes a convex curved section. Inner layer 112 may be an alloyed spring steel, alloyed high strength steel, etc. In one embodiment, the steel is of a hardness between 50-54 RHC (Rockwell hardness C). In another embodiment, the steel is of a hardness between 45-60 RHC.

Tape blade 14 includes an upper coating layer 114 coupled to (e.g., attached, bonded, glued, etc.) onto the concave upper surface of inner metal layer 112 and a lower coating layer 116 coupled to (e.g., attached, bonded, glued, etc.) onto the convex lower surface of inner metal layer 112. In general, coating layers 114 and 116 are formed from a polymer material, and in a specific embodiment, are formed from a nylon material. As shown, coating layer 114 has an upper surface 118 that defines the uppermost surface of tape blade 14, and coating layer 116 has a lower surface 120 that defines the lowermost surface of the majority of tape blade 14. Ink layers are located between coating layers 114 and 116 forming measurement markings or indicia, and specifically the ink layers are located on upper and lower surfaces of inner metal layer 112 between coating layers 114 and 116 respectively. In specific embodiments, the coating layers discussed herein are formed from a nylon 12 material and/or a nylon 6/6 material. In various embodiments, coating layers 114 and 116 may be applied as a lacquer, laminate, nylon extrusion, film attached with adhesive, or a power/spray on coating.

In one embodiment, coating layers 114 and 116 may be applied over the entire length of inner layer 112. In one embodiment, coating layers 114 and 116 are applied over at least 6 feet of the length of inner layer 112, specifically over at least 8 feet of the length of inner layer 112, and more specifically over at least 10 feet of the length of inner layer 112. In specific embodiments, these coating lengths are contiguous lengths of coating material.

In a specific embodiment, coating layers 114 and 116 are formed from a nylon lacquer and have relatively smooth outer surfaces 118 and 120 respectively. In at least some embodiments, it is believed that the nylon lacquer has a higher surface energy than a film or extruded layer, which leads to better bonding to the adhered polymer film. Compared to the nylon extrusion, lacquer has a smoother surface. Different polymers have different surface energies, which can change bond strength, and when combined with surface roughness will provide different low temperature performance. To get an improved performance and a higher bond/peel force which can be achieved by matching glue to the layer on which it is being applied. Thickness and type of glue also relate to peel force. In the case of a pressure sensitive adhesive, the pressure at which film is applied is also a factor related to peel strength.

As shown in FIG. 3, a tape blade film 122 is bonded or adhered to outer surface 120 of lower coating layer 116. In such embodiments and without being bound by theory, Applicant believes that placement of film 122 on the lower surface provides reinforcement while at the same time reduces the chance of delamination due to the mechanics of the tape blade during whipping. When film is applied to the bottom side, the film is under tension vs. compression during tape whip. This helps with increased stiffness as well as low temperature performance of the film. In another embodiment, film 122 can be applied directly to the paint-print layer without a coating layer in between.

Figure 10:
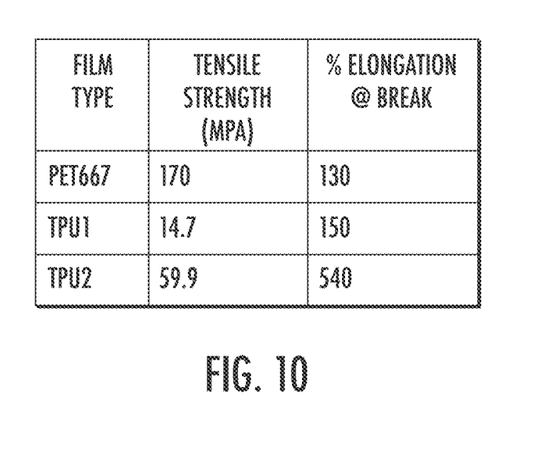
FIG. 10 shows tensile strength and elongation at break for materials for a tape blade film, according to exemplary embodiment.

In general, tape blade film 122 is a reinforcing layer formed from a polymer material, and specifically a transparent polymer material to allow viewing of marking indicia located below film 122 in the tape blade construction. In various embodiments, tape blade film 122 is formed from a polymer material having a high stiffness that Applicant has determined reduces the likelihood of whip during tape blade retraction. In various embodiments, the stiffness of film 122 is selected to be higher than other commonly used tape blade materials to reduce whipping. In a specific embodiment, tape blade film 122 is formed from a polyethylene terephthalate (PET) material, such as a PET material having relatively high stiffness. In specific embodiments, tensile modulus, flexural modulus and hardness will combine with characteristics of the film to provide stiffness and when applied to tape, resists tape whipping during retraction. FIG. 10 shows modulus and elongation at break data for materials that may be used for tape blade film 122. In another embodiment, tape blade film 122 is formed from a thermoplastic polyurethane (TPU) material.

Tape blade film 122 is located adjacent to hook end 110 such that it is overlapped by hook tab 124. Unlike coating layers 114 and 116, tape blade film 122 has a length L1 such that tape blade film 122 extends a relatively short portion of the length of tape blade 14 from hook end 110. In various embodiments, L1 is less than 20% of the total length of tape blade 14, specifically is less than 10% of the total length of tape blade 14, and more specifically is 5% or less of the total length of tape blade 14. In various embodiments, L1 is 2 inches to 12 inches, specifically is 4 inches to 8 inches, and more specifically is 5 inches to 7 inches. In a specific embodiment, L1 is 6 inches plus or minus 5%. Applicant has determined that a relatively short reinforcing layer such as tape blade film 122 provides for improved tape blade strength, wear, crack and whip resistance without unduly increasing the total thickness of the spooled tape blade.

In various embodiments, Applicant has determined that particular thicknesses of tape blade film 122 and of coating layers 114 and 116 provide for increased tape blade protection without unduly increasing tape spool diameter. As shown in FIG. 3, coating layer 114 has thickness, T2, coating layer 116 has a thickness, T3, and tape blade film 122 has a thickness T4. In various embodiments, T4 is between 0.03 mm and 0.3 mm, specifically is between 0.1 mm and 0.2 mm, and more specifically is between 0.14 mm and 0.16 mm. In a specific embodiment, T4 is 0.15 mm plus or minus 0.005 mm. In another specific embodiment, T4 is between 0.14 mm and 0.25 mm.

In various embodiments, coating layers 114 and/or 116 formed from a polymer material, such as a polymer lacquer, and have thicknesses T2 and/or T3 between 0.01 mm and 0.03 mm and specifically is about 0.02 mm. In specific embodiments, coating layers 114 and/or 116 formed from a nylon lacquer having thicknesses T2 and/or T3 between 0.01 mm and 0.03 mm and specifically is about 0.02 mm. In a specific embodiment, steel thickness is 0.11, nylon lacquer is 0.02-0.03 thick on each side.

In specific embodiments, tape blade film 122 is adhered to the adjacent coating layer via a layer of adhesive material 126. In various embodiments, adhesive layer 126 is formed from a polymeric adhesive such as a pressure sensitive adhesive. In a specific embodiment, adhesive layer 126 is a pressure sensitive acrylic material.

Applicant has determined that by balancing the thickness of tape blade film 122 and the thickness of adhesive layer 126, a very high level of adhesion of tape blade film 122 to tape blade 14 can be achieved. In various embodiments, the thickness of adhesive layer 126 is 0.01 mm and 0.05 mm, specifically is 0.01 mm to 0.035, and more specifically is 0.02 mm plus or minus 5%. In various embodiments, the ratio of the adhesive layer thickness to T4 is selected to provide improved adhesion/peel strength. In various embodiments, the ratio of the adhesive layer thickness to T4 is between 0.05 and 0.25, specifically is between 0.1 and 0.15 and more specifically is between 0.13 and 0.14.

In specific embodiments, Applicant has determined that level of adhesion strength (as determined by the peel strength test defined by ASTMD3330 and described below) is substantially higher than commercially available tape measures tested by Applicant. Applicant has determined that this measured property of a tape blade protective layer correlates with the likelihood of delamination of the protective layer from the tape blade, which is one of the primary failure modes of a tape blade protective layer. In various embodiments, the peel strength between tape blade film 122 and the adjacent coating layer is greater than 9 lbs., specifically is greater than 10 lbs. and more specifically is greater than 11 lbs. In specific embodiments where coating layer 116 is a smooth layer of nylon lacquer, Applicant's designs achieve peel strengths greater than 18 lbs. (see e.g., examples in Table 1 below).

Referring to FIG. 4, dimensional details of tape blade film 122 are shown according to an exemplary embodiment. In the specific embodiment shown, tape blade film 122 is sized for attachment to an inner metal layer 112 having a width of 32 mm.

Referring to FIGS. 3 and 4, because of the positioning of tape blade film 122 adjacent hook assembly 26, hook rivets 128 pass through tape blade film 122. To accommodate hook rivets 128, tape blade film 122 includes at least one opening for each hook rivet 128. In the specific embodiment shown, hook assembly 26 includes two rivets 128, and thus, tape blade film 122 includes a first rivet opening 130 and a second rivet opening 132. To position rivet openings 130 and 132 adjacent to hook assembly 26, rivet openings 130 and 132 are located in the first half, and specifically the first quarter, of the length of tape blade film 122. In another embodiment, if PET film is applied before hole punching for rivets, film 122 and the other layers of the tape blade can be stamped at same time.

Figure 5:
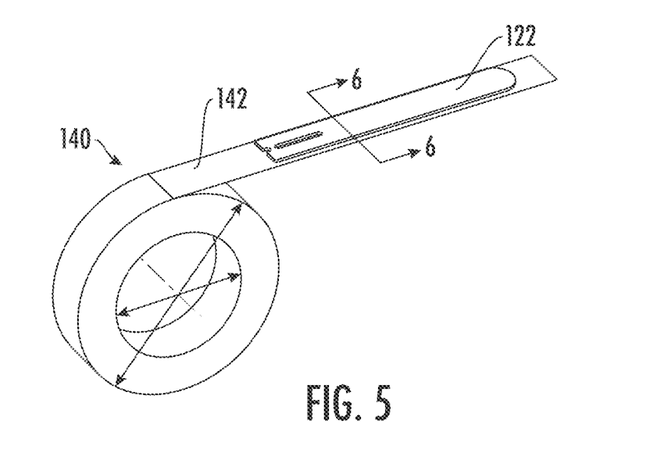
FIG. 5 is a perspective view of the tape blade film of FIG. 4 located on a roll of adhesive protective film, according to an exemplary embodiment.
Figure 6:
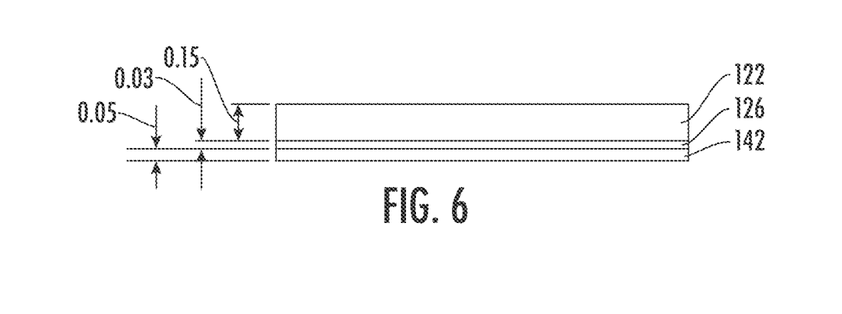
FIG. 6 is a cross-sectional view showing the tape blade film of FIG. 5 located on the roll of release liner, according to an exemplary embodiment.

Referring to FIG. 5, multiple tape blade films 122 may be provided on a roll 140 of release liner 142. During manufacture of tape blade 14, one tape blade film 122 is removed from roll 140 and adhered via adhesive to each tape blade. FIG. 6 shows a cross-sectional view of a particular embodiment of tape blade film 122 on the release liner 142. In various embodiments, the thicknesses of tape blade film 122, adhesive layer 126 and release liner 142 are shown in FIG. 6. In one embodiment, the thickness dimensions shown in FIG. 5 are in inches, and in another embodiment, the thickness dimensions shown in FIG. 5 are in millimeters.

Figure 7:
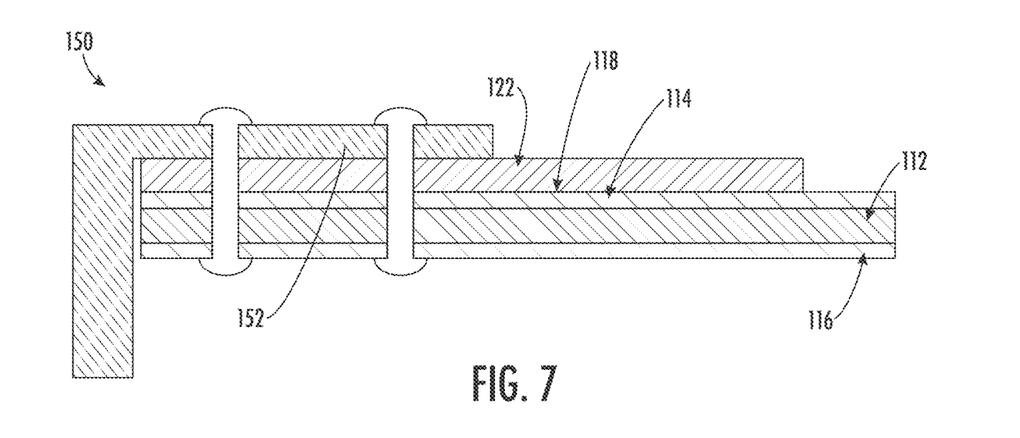
FIG. 7 is a cross-sectional view of the hook end of a tape blade of the tape measure of FIG. 1 showing a tape blade film located on top of the tape blade, according to an exemplary embodiment.

FIG. 7 shows hook end 150 according to an exemplary embodiment. Hook end 150 is substantially the same as hook end 110, except for the differences discussed herein. In the arrangement of hook end 150, tape blade film 122 is coupled to outer surface 118 of upper coating layer 114. In this arrangement, tape blade film 122 is located on the upper surface of tape blade 14, and is positioned such that an outer surface of tape blade film 122 is in contact with an inner surface of hook tab 152.

Tape Blade Film and Adhesive Materials

In various embodiments, Applicant has identified a variety of specific materials for tape blade film 122 and adhesive layer 126 that are believed to improve one or more of the performance characteristics of tape blade film 122 discussed herein.

In specific embodiments, tape blade film 122 is formed from a PET material. In general, Applicant has determined that the stiffer the material of tape blade film 122, the more resistance it provides to stop tape blade 14 from whipping during retraction. Applicant has determined that PET is an especially stiff film compared to other potential polymers, while still being transparent. In a specific embodiment, tape blade film 122 is formed from PET film 75% CAS. NO. 931-36-2.

In a specific embodiment, tape blade film 122 is a PET film with acrylic glue forming layer 126. In this embodiment, the film with glue has 75% PET, 12.5% polyurethane, 10% epoxy resin, 2.5% curing agent.

In specific embodiments, tape blade film 122 is formed from a polymer material, such as PET, having the following physical characteristics. Transparent in color, density in g/m3 of 1.395-1.405; Melting Point, GB/T 13541, 259.5°; Tensile Strength, MPA, GB/T 13541, 170/210; Elongation at Break,%, GB/T 13541, 130/110; Heat Shrinkage, %, GB/T 13541, 1.5/0.5); Continuous Use Temperature, −20° C.~120° C.).

In various embodiments, the material that forms adhesive layer 126 is a pressure sensitive polymer adhesive and specifically is a pressure sensitive acrylic material. In a specific embodiment, the material that forms adhesive layer 126 is an acrylic glue that includes: polyurethane 12.5% (CAS. NO. 51852-81-4), modified epoxy tree ester modified epoxy resin 10% (CAS. NO. 25068-38-6); curing agent 2.5% CAS No. 931-36-2.

In a specific embodiment, the material that forms adhesive layer 126 includes one or more of the following properties: Initial adhesion, GF/INCH, FINAT 9, >1000; 180° Peel Strength, GF/INCH, ASTM D3330, >800; Permanent Adhesion, H, FINAT 8, >24; Thickness, ASTM D3652, (0.03±0.002) MM; Continuous Use Temperature, −10° C.~80° C.

Peel Strength and Test Procedure

As noted above, Applicant has determined that peel strength of tape blade film 122 formed as discussed herein has much higher peel strength as compared to commercially available prior art tape measures. Without wishing to be bound by theory, Applicant believes that the tape blade films discussed herein have increased peel strength due to the nature of the interface between the adjacent coating layer and the adhesive. In addition, the thickness of the tape blade film also appears to relate to peel strength.

Figure 8:
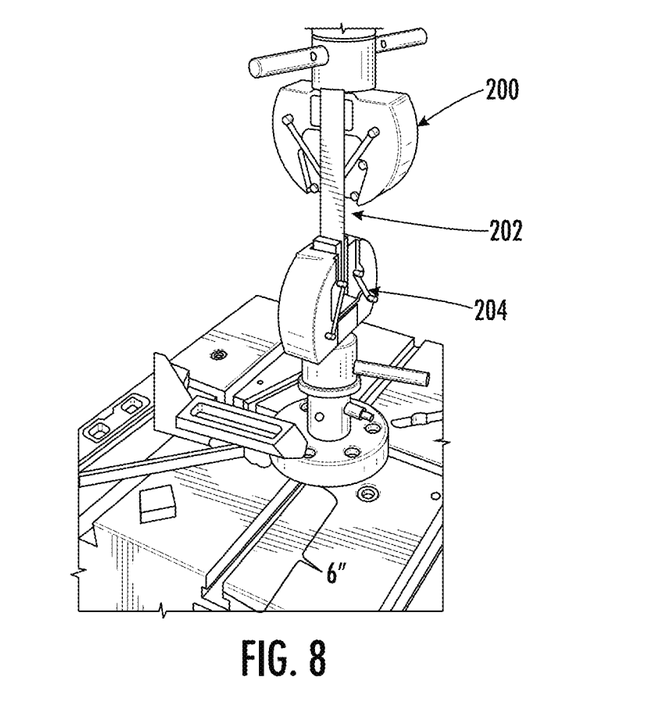
FIGS. 8 and 9 illustrate aspects of a test procedure for measuring the peel strength of various tape measures with tape blade film prototypes discussed herein as well as the films/coatings of commercially available tape measures for comparison.
Figure 9:
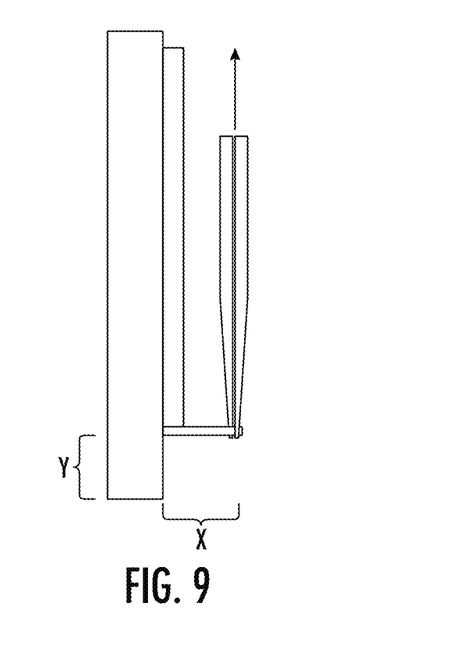

Table 1 below shows the peel strength of two arrangements of tape blade 14 with tape blade film 122 discussed herein compared to two commercially available tape measures. The procedure for testing peel strength is set forth in ASTMD3330, and images of an example test procedure are shown in FIGS. 8 and 9. As shown in FIG. 8, Instron clamp 200 grips the film on tape blade 202, and Instron clamp 204 secures the tape blade. For setup, the tape blade is located so that the folded over area of the film is within Instron clamp 200. A one inch length of test sample tape blade 202 is clamped within Instron clamp 204, and the base is located six inches from the edge. FIG. 9 shows the clamping of the sample. The clamp is lowered so that the clamp can grip the fold over section, and the machine's extension is set to zero. In the test, the extension rate is set to 8 mm/s. Start is selected to run the test, and when the clamps have reached the maximum extension, return to zero is selected. The output data from the test run is machine extension distance and force, and the force measurements within different regions are averaged such as within a region of 75.0 mm to 225.00 mm.

tion tests. During this test, the tape is pulled out of the housing by 8' and then the tape measure retracts the tape back into the housing. This is performed on a testing machine that holds each tape measure in the same position for each test and minimizes human variation. The Commercially Available Prior Art 2 tape measures took, on average, 0.75 seconds to retract the 8' (range of 0.66-1.0 seconds) and averaged 162.4 cycles before the tape blade tore (range of 56-314 cycles). In addition, Applicant took 10 new samples of the 25 ft. version of Commercially Available Prior Art 2 tape measures, removed the protective film located on the first 6 inches or so, and performed the same retraction test. The Commercially Available Prior Art 2 without the film averaged 0.739 seconds to retract (range of 0.65-0.99 seconds) and averaged only 58.9 cycles before the blade tore (range of 14-111). Thus, for Commercially Available Prior Art 2 tape measures tested, the film on the first six inches increased the life by an average of 103.5 cycles.

Applicant also performed the same retraction tests with the 25 ft. versions Commercially Available Prior Art 1 tape measures (e.g., with 10 samples with the film and 10 samples without the film). With the film, Commercially Available Prior Art 1 tape measures averaged 0.698 seconds to retract (range of 0.63-0.79 seconds) and averaged 179.7 cycles before the tape blade tore (range of 22-683). Without the film, Commercially Available Prior Art 1 tape measures averaged 0.685 seconds to retract (range of 0.60-0.76 seconds) and averaged 75.8 cycles before the tape blade tore (range of 21-194 cycles). Thus, for Commercially Available Prior Art 1 tape measures, the film on the first six inches increased the life by an average of 103.9 cycles.

Applicant also performed the same retraction tests with the 25 ft. versions of Prototype 2. Applicant used a 25 ft. version of Prototype 2. Applicant tested three samples of

TABLE 1

| Test Sample | Blade Width (mm) | Blade Coating | Film Material and Thickness | Glue | Film Location Top/Bottom | Average Force (lb) | Average (lb) |
|---|---|---|---|---|---|---|---|
| Prototype 1 | 32 | Nylon Lacquer | 0.15 mm PET | 0.02 mm Pressure Sensitive Acrylic Glue | Top | 19.32 18.77 19.02 | 19.04 |
| Prototype 2 | 32 | Nylon Lacquer | 0.15 mm PET | 0.02 mm Pressure Sensitive Acrylic Glue | Bottom | 19.83 18.13 18.22 | 18.73 |
| Commercially Available Prior Art 1 | 32 | Polyester | 0.14 mm thermoplastic Polyurethane (TPU) | .047 pressure sensitive Acrylic glue | Top | 8.67 8.57 8.53 | 8.59 |
| Commercially Available Prior Art 2 | 32 | Polyester | 0.13 mm TPU | 0.047 mm Pressure sensitive Acrylic glue | Top | 7.07 7.23 6.01 | 6.77 |

Figure 11:
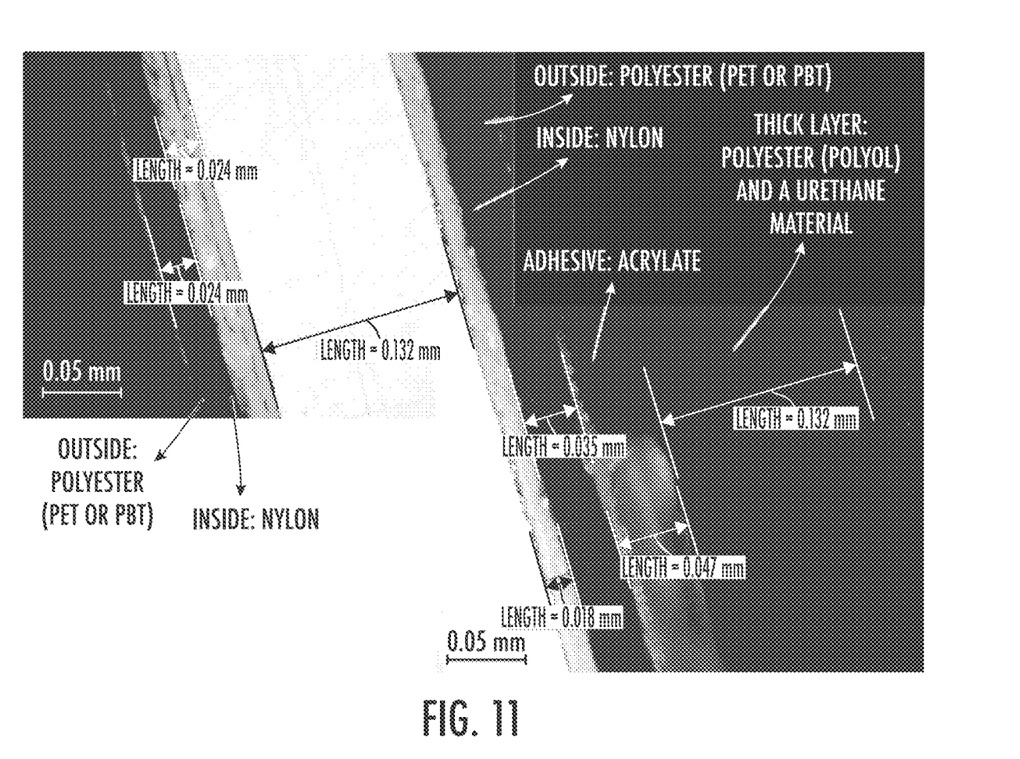
FIG. 11 shows cross-sectional images of the tape blade of Commercially Available Prior Art 1.
Figure 12:
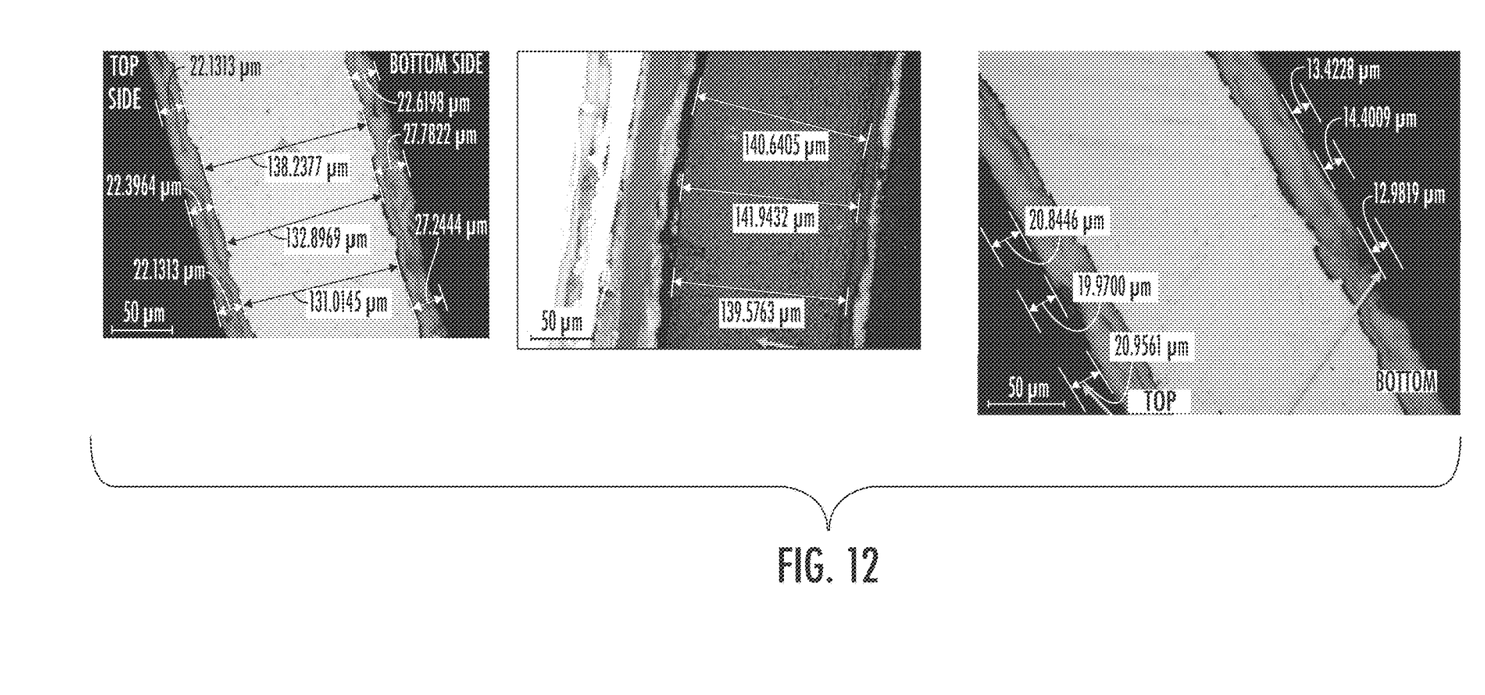
FIG. 12 shows cross-sectional images of the tape blade of Commercially Available Prior Art 2.

Commercially Available Prior Art 1 and Commercially Available Prior Art 2 each have a blade that has a first film over the entire blade, and a second film at the first six inches that is overtop the first film. Commercially Available Prior Art 1 has thicker films than the Commercially Available Prior Art 2. For reference, labeled and annotated magnified photographs of Commercially Available Prior Art 1 and Commercially Available Prior Art 2 are shown in FIGS. 11 and 12, respectively In addition to the peel strength testing discussed above, Applicant also tested the number of retractions of various tape blade that it took to cause delamination of the various tape blade protective layers. During this testing, Applicant took 10 samples of the 25 ft. version of Commercially Available Prior Art 2 tape measures and performed retrac- Prototype 2 without the PET film on the first six inches, which had an average retraction time of 0.83 seconds (range of 0.83-0.84 seconds) and averaged 112 cycles before the tape tore (range of 65-173 cycles). Applicant then tested four samples of Prototype 2 that did have the PET film on the first six inches of the tape blade, and these had an average retraction time of 0.86 seconds (range of 0.83-0.87 seconds) but averaged 2,023.8 cycles before the tape blade tore (range of 1430-2331). Thus, the reinforcement of PET film on the tape blade of Prototype 2 increased the life of the blade in this test by over 1,911 cycles (i.e., lengthened the life by a factor of 18).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
a housing:
a reel rotatably mounted within the housing;
an elongate blade wound around the reel, the elongate blade having an inner end coupled to the reel and an outer end extending out of the housing;
a hook assembly coupled to the outer end of the elongate blade; and
a retraction system coupled to the reel, wherein the retraction system drives rewinding of the elongate blade on to the reel;
wherein the elongate blade comprises:
an elongate metal core having an upper surface and a lower surface, wherein the upper surface includes a concave curved section and the lower surface includes a convex curved section;
an upper polymer coating layer covering at least a portion of the upper surface of the elongate metal core;
a lower polymer coating layer covering at least a portion of the lower surface of the elongate metal core;
an ink layer forming a series of measurement markings and located between the upper surface of the elongate metal core and the upper polymer coating layer; and
a protective film coupled via an adhesive to an outer surface of the lower polymer coating layer at the outer end of the elongate blade such that the hook assembly overlaps with a portion of the protective film, the protective film having a length that is less than 20% of a total length of the elongate blade;
wherein a thickness of the protective film is between 0.03 mm and 0.3 mm; and
wherein the adhesive has a thickness between 0.01 mm and 0.05 mm.

2. The tape measure of claim 1, wherein the length of the protective film is 2 to 12 inches.

3. The tape measure of claim 1, wherein the hook assembly includes a hook tab that overlaps the portion of the protective film.

4. The tape measure of claim 1, wherein the protective film has an average thickness between than 0.14 mm and 0.25 mm.

5. The tape measure of claim 1, wherein the protective film comprises a transparent PET material.

6. The tape measure of claim 5, wherein the elongate metal core comprises a steel material having a hardness of 45-60 RHC, the upper and lower polymer coating layers comprise nylon.

7. The tape measure of claim 6, wherein the upper and lower polymer coating layers comprise a nylon lacquer.

8. The tape measure of claim 1, wherein the elongate blade has a length less than 50 feet.

9. The tape measure of claim 1, wherein a peel strength between the protective film and the outer surface of the lower polymer coating layer is greater than 9 lbs.

10. A tape measure comprising:
a housing:
a reel rotatably mounted within the housing;
an elongate blade wound around the reel, the elongate blade having an inner end coupled to the reel and an outer end;
a hook assembly coupled to the outer end of the elongate blade; and
a retraction system coupled to the reel, wherein the retraction system drives rewinding of the elongate blade on to the reel;
wherein the elongate blade comprises:
an elongate metal core having an upper surface and a lower surface, wherein the upper surface includes a concave curved section and the lower surface includes a convex curved section; and
a protective film coupled via an adhesive layer to the elongate metal core, the protective film having a length less than a total length of the elongate blade;
wherein a ratio of a thickness of the adhesive layer to a thickness of the protective film is between 0.05 and 0.25.

11. The tape measure of claim 10, further comprising a polymer coating layer coupled to the elongate metal core, wherein the protective film is directly coupled to an outer surface of the polymer coating layer via the adhesive layer.

12. The tape measure of claim 11, wherein the length of the protective film is less than a length of the polymer coating layer.

13. The tape measure of claim 12, wherein the polymer coating layer is coupled to a lower surface of the elongate metal core, and the protective film is located underneath the elongate metal core.

14. The tape measure of claim 10, wherein a peel strength between the protective film and an adjacent surface of the elongate blade is greater than 9 lbs, wherein the peel strength is measured via the test defined by ASTMD3330.

15. A tape measure comprising:
a housing:
a reel rotatably mounted within the housing;
an elongate blade wound around the reel, the elongate blade having an inner end coupled to the reel and an outer end;
a hook assembly coupled to the outer end of the elongate blade; and
a retraction system coupled to the reel, wherein the retraction system drives rewinding of the elongate blade on to the reel;
wherein the elongate blade comprises:
an elongate metal core having an upper surface and a lower surface, wherein the upper surface includes a concave curved section and the lower surface includes a convex curved section;
an upper polymer coating layer covering at least a portion of the upper surface of the elongate metal core;
a lower polymer coating layer covering at least a portion of the lower surface of the elongate metal core;
an ink layer forming a series of measurement markings and located between the upper surface of the elongate metal core and the upper polymer coating layer;
an adhesive layer coupled to at least one of an outer surface of the upper polymer coating layer and an outer surface of the lower polymer coating layer; and
a protective film coupled to the adhesive layer at a location such that a portion of the hook assembly overlaps the protective film, wherein the protective film comprises a PET polymer material, and further wherein the protective film has a length that is less than 20% of a total length of the elongate blade.

16. The tape measure of claim 15, the protective film has a length that is less than 10% of a total length of the elongate blade.

17. The tape measure of claim 16, wherein the adhesive layer is coupled to an outer surface of the lower polymer coating layer.

18. The tape measure of claim 15, wherein the upper and lower polymer coating layers each comprise a nylon lacquer having a thickness between 0.01 mm and 0.03 mm.

19. The tape measure of claim 15, wherein the elongate blade has a length less than 50 feet.

20. The tape measure of claim 15, wherein a peel strength between the protective film and the at least one of the outer surface of the upper polymer coating layer and the outer surface of the lower polymer coating layer is greater than 9 lbs.

* * * * *